United States Patent
Jung et al.

(10) Patent No.: US 12,177,515 B2
(45) Date of Patent: Dec. 24, 2024

(54) METHOD AND APPARATUS FOR TRANSMITTING/RECEIVING DIGITAL BROADCAST

(71) Applicant: ELECTRONICS AND TELECOMMUNICATIONS RESEARCH INSTITUTE, Daejeon (KR)

(72) Inventors: Joon Young Jung, Daejeon (KR); Je Won Lee, Daejeon (KR); Dong Joon Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/940,848

(22) Filed: Sep. 8, 2022

(65) Prior Publication Data
US 2023/0144522 A1    May 11, 2023

(30) Foreign Application Priority Data
Nov. 11, 2021  (KR) .......................... 10-2021-0154846

(51) Int. Cl.
*H04N 21/4385*  (2011.01)
*H04N 21/43*    (2011.01)

(52) U.S. Cl.
CPC ..... *H04N 21/4385* (2013.01); *H04N 21/4307* (2013.01)

(58) Field of Classification Search
CPC ....................... H04N 21/4385; H04N 21/4307
See application file for complete search history.

(56) References Cited

U.S. PATENT DOCUMENTS

| | | | |
|---|---|---|---|
| 9,246,806 B2 | 1/2016 | Seo | |
| 2013/0067520 A1* | 3/2013 | Corl | ..................... H04N 21/431 725/54 |
| 2014/0298466 A1* | 10/2014 | Li | ........................... H04L 63/14 726/23 |
| 2016/0255394 A1* | 9/2016 | Yang | ................... H04N 21/4348 725/131 |
| 2018/0035153 A1* | 2/2018 | Yang | ..................... H04N 21/478 |
| 2021/0067821 A1 | 3/2021 | Kim | |

FOREIGN PATENT DOCUMENTS

| KR | 10-0574230 B1 | 4/2006 |
|---|---|---|
| KR | 10-2014-0091975 A | 7/2014 |
| KR | 10-2015-0030584 A | 3/2015 |
| KR | 10-2016-0116336 A | 10/2016 |

* cited by examiner

*Primary Examiner* — Joshua D Taylor

(57) ABSTRACT

According to an embodiment of the present disclosure, there is provided a method and apparatus for transmitting/receiving a digital broadcast. The method for transmitting a digital broadcast, the method comprising: configuring AV data; configuring broadcast data; configuring application signaling information (ASI) by considering at least one of the AV data and the broadcast data or combination thereof; configuring an MPEG-based transport stream by multiplexing the AV data, the broadcast data and the ASI; and transmitting the MPEG-based transport stream, wherein the ASI includes data for driving an application executed by a broadcast receiver.

16 Claims, 9 Drawing Sheets

| Syntax | Bit depth | Note |
|---|---|---|
| application_signaling_section() { | | |
|   table_id | 8 | |
|   section_syntax_indicator | 1 | '1' |
|   private_indicator | 1 | '1' |
|   reserved | 2 | |
|   section_length | 12 | |
|   transport_stream_id | 16 | |
|   reserved | 2 | "11" |
|   version_number | 5 | |
|   current_next_indicator | 1 | |
|   section_number | 8 | |
|   last_section_number | 8 | |
|   protocol_version | 8 | |
|   operator_ID | 8 | |
|   num_programs_in_section | 8 | |
|   for (j=0; j< num_programs_in_section; j++) { | | |
|     program_number | 16 | |
|     reserved | 7 | "1111111" |
|     event_bound_flag | 1 | |
|     if event_bound_flag == 0 { | | |
|       application_type | 8 | |
|       application_version | 8 | |
|       protocol_type | 8 | |
|       URL_byte_length | 8 | |
|       URL_byte() | Var | |
|       reserved | 4 | "1111" |
|       Descriptor_length | 12 | |
|       for(i=0;i<N;i++){ | | |
|         descriptor() | | |
|       } | | |
|     } | | |

FIG. 2B

| Syntax | Bit depth | Note |
|---|---|---|
| else { | | |
| num_events | 8 | |
| for(j=0;j< num_events;j++){ | | |
| reserved | 2 | "11" |
| event_ID | 14 | |
| start_time | 32 | |
| application_type | 8 | |
| application_version | 8 | |
| protocol_type | 8 | |
| URL_byte_length | 8 | |
| URL_byte() | Var | |
| reserved | 4 | "1111" |
| Descriptor_length | 12 | |
| for(i=0;i<N;i++){ | | |
| descriptor() | | |
| } | | |
| } | | |
| } | | |
| } | | |
| CRC_32 | 32 | |
| } | | |

FIG. 3A

| application_type | DESCRIPTION |
|---|---|
| 0x00 | RESERVED VALUE FOR FUTURE USE |
| 0x01 | WEB VoD SERVICE |
| 0x02 | T-Commerce SERVICE |
| 0x03 ~ 0xFF | RESERVED VALUE FOR FUTURE USE |

FIG. 3B

| Protocol_type | DESCRIPTION |
|---|---|
| 0x00 | RESERVED VALUE FOR FUTURE USE |
| 0x01 | TRANSMISSION VIA HTTP |
| 0x02 ~ 0xFF | RESERVED VALUE FOR FUTURE USE |

METHOD AND APPARATUS FOR TRANSMITTING/RECEIVING DIGITAL BROADCAST

CROSS REFERENCE TO RELATED APPLICATION

The present application claims priority to a Korean patent application 10-2021-0154846, filed Nov. 11, 2021, the entire contents of which are incorporated herein for all purposes by this reference.

BACKGROUND OF THE INVENTION

Field of the Invention

The present disclosure relates to a method and apparatus for transmitting/receiving a digital broadcast, and more particularly, to a method and apparatus for transmitting/receiving digital broadcast data and IP-based service data.

Description of the Related Art

Digital broadcast receivers like digital TV provide a digital broadcasting service and also has a function of providing video services like Youtube and Netflix as well as web services by connecting to an Internet network.

Furthermore, digital broadcast receivers called smart TV are providing various services from a game application, an education contents play application and a media (e.g., films, music and photos) play application, which are installed in the receivers. However, applications executed in a digital broadcast receiver are configured to provide an independent service without interworking with the broadcasting service.

In other words, a broadcasting service and an IP-based service are configured to provide their own service independently without interworking between them.

SUMMARY

A digital broadcast receiver like a digital TV receives terrestrial and cable broadcast data through RF signal inputs and provides a broadcasting service based on it. Furthermore, a service provider (SO) of a terrestrial or cable channel and other program providers (PP) providing each service channel are demanding provision of IP-based services such as commercials, videos and home shopping that interwork with a broadcasting service.

However, contents can be effectively provided as required by providers, only when an IP service is provided in line with a broadcasting service that is provided in real time. Unfortunately, the current broadcasting system has difficulty in providing a real-time IP-based service synchronized with a broadcasting service.

A technical object of the present disclosure is to provide a method and apparatus for enabling a service provider or a program provider to provide an IP-based service interworking with a broadcasting service through an existing digital broadcasting system.

The technical objects of the present disclosure are not limited to the above-mentioned technical objects, and other technical objects that are not mentioned will be clearly understood by those skilled in the art through the following descriptions.

According to an embodiment of the present disclosure, there is provided a method for transmitting a digital broadcast. The method comprising: configuring AV data; configuring broadcast data; configuring application signaling information (ASI) by considering at least one of the AV data and the broadcast data or combination thereof, configuring an MPEG-based transport stream by multiplexing the AV data, the broadcast data and the ASI; and transmitting the MPEG-based transport stream, wherein the ASI includes data for driving an application executed by a broadcast receiver.

According to another embodiment of the present disclosure, there is provided a method for receiving a digital broadcast. The method comprising: distinguishing AV data, broadcast data and application signaling information (ASI) by receiving an MPEG-based transport stream and demultiplexing the transport stream; processing the AV data; processing the broadcast data; and checking the ASI and driving an application based on information in the ASI.

According to another embodiment of the present disclosure, there is provided an apparatus for transmitting a digital broadcast, the apparatus comprising: an AV data configuration unit configured to configure AV data; a broadcast data generator configured to configure broadcast data; an application signaling information (ASI) configuration unit configured to configure ASI by considering at least one of the AV data and the broadcast data; a multiplexer configured to configure an MPEG-based transport stream by multiplexing the AV data, the broadcast data and the ASI; and a data transmitter configured to transmit the MPEG-based transport stream, wherein the ASI includes data for driving an application executed by a broadcast receiver.

The features briefly summarized above with respect to the present disclosure are merely exemplary aspects of the detailed description below of the present disclosure, and do not limit the scope of the present disclosure.

According to the present disclosure, it is possible to provide a digital broadcast data transmission/reception apparatus and method in which a service provider or a program provider provides an IP-based service interworking with a broadcasting service in real time through an existing DTV broadcasting system.

According to the present disclosure, it is possible to provide a digital broadcast data transmission/reception apparatus and method in which independent signaling information different from signaling information used in an existing DTV system is transmitted to drive an application interworking with a broadcasting service.

According to the present disclosure, it is possible to provide a digital broadcast data transmission/reception apparatus and method in which an application can be driven in each service channel or in each program event of a channel.

Effects obtained in the present disclosure are not limited to the above-mentioned effects, and other effects not mentioned above may be clearly understood by those skilled in the art from the following description.

DETAILED DESCRIPTION OF THE INVENTION

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

In the present document, such phrases as 'A or B', 'at least one of A and B', 'at least one of A or B', 'A, B or C', 'at least one of A, B and C' and 'at least one of A, B or C' may respectively include any one of items listed together in a corresponding phrase among those phrases or any possible combination thereof.

Hereinafter, the present disclosure will be described in further detail with reference to the accompanying drawings.

Figure 1:
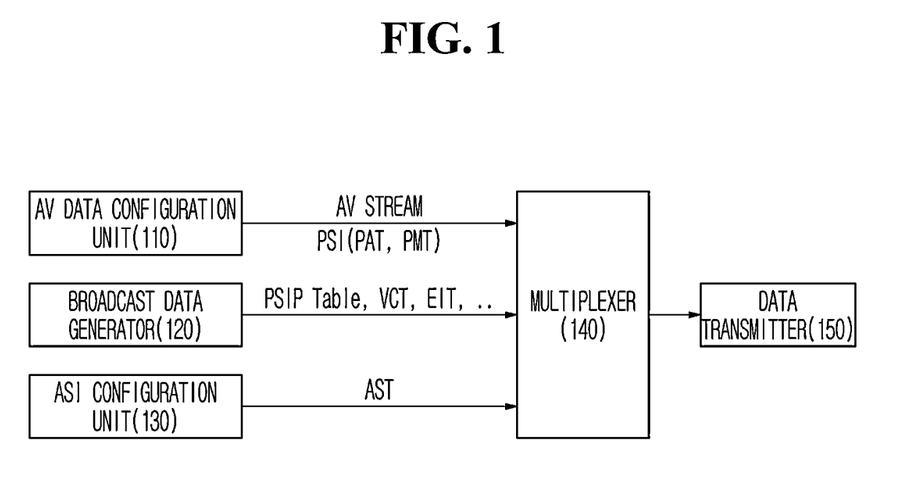
FIG. 1 is a block diagram illustrating a digital broadcast transmitter according to an embodiment of the present disclosure.

FIG. 1 is a block diagram illustrating a digital broadcast transmitter according to an embodiment of the present disclosure.

Referring to FIG. 1, a digital broadcast transmitter according to an embodiment of the present disclosure may include an audio/video (AV) data configuration unit 110, a broadcast data generator 120, an application signaling information (ASI) configuration unit 130, a multiplexer (MUX) 140, and a data transmitter 150.

The AV data configuration unit 110 may encode audio and video data according to a digital broadcast transmission/reception conformance standard and configure and output an AV stream. In addition, the AV data configuration unit 110 may generate an AV packet and a signaling packet by packetizing AV data and signaling information indicating the AV data and output a transmission packet including the AV packet and the signaling packet. Herein, the digital broadcast transmission/reception conformance standard may be based on the ATSC (Advanced Television System Committee) 3.0 broadcast technology standard. In addition, the signaling information indicates information on AV data that is transmitted by the AV data configuration unit 110. That is, signaling information is generated only for AV data that is generated by each AV data configuration unit 110.

Herein, a packetizing scheme may be employed between the above-described ROUTE protocol scheme and MMT protocol scheme. A ROUTE protocol and an MMT protocol are configured to generate signaling information in different ways.

The broadcast data generator 120 may generate and output a signaling packet that includes signaling information for a plurality of AV datasets in each broadcasting service. For example, the signaling information may include a program and system information protocol (PSIP), a virtual channel table (VCT), an EIT and the like.

Particularly, the ASI configuration unit 130 may configure and provide application signaling information. Herein, ASI has an MPEG-2 private section data structure and may be provided by consisting of a separate TS packet different from an existing broadcasting service. ASI may be configured as an application signaling table (AST), and a detailed construction of an AST will be described in detail with reference to FIG. 2A and FIG. 2B below.

The ASI configuration unit 130 may configure and output ASI every predetermined time unit (e.g., every 5 seconds). Accordingly, a broadcast receiver may be embodied to drive an application continuously according to a viewer's viewing point.

Furthermore, the ASI configuration unit 130 may configure ASI for each corresponding channel or each corresponding event and may construct an AST based on information corresponding to PSI in a transport stream. Accordingly, a broadcast receiver may distinguish channels or distinguish information of an application in each channel based on information of an AST corresponding to PSI and operate a proper application.

The multiplexer 140 configures a broadcast signal by muxing data that are provided by the AV data configuration unit 110, the broadcast data generator 120 and the ASI configuration unit 130 respectively. In addition, it sends the broadcast signal via the data transmitter 150.

Figure 2A:
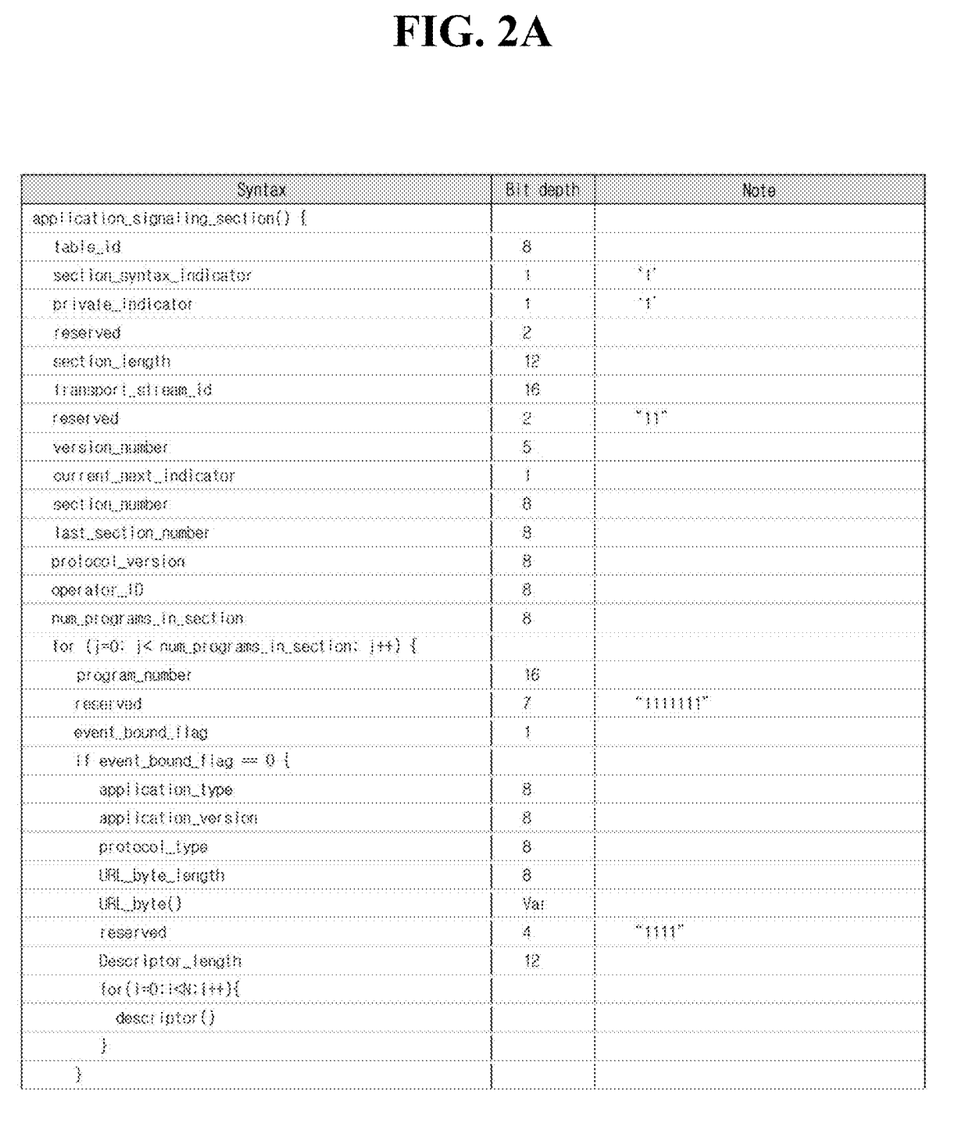
FIG. 2A and FIG. 2B are views exemplifying an AST generated by an ASI configuration unit 130 of a digital broadcast transmitter according to an embodiment of the present disclosure.
Figure 2B:
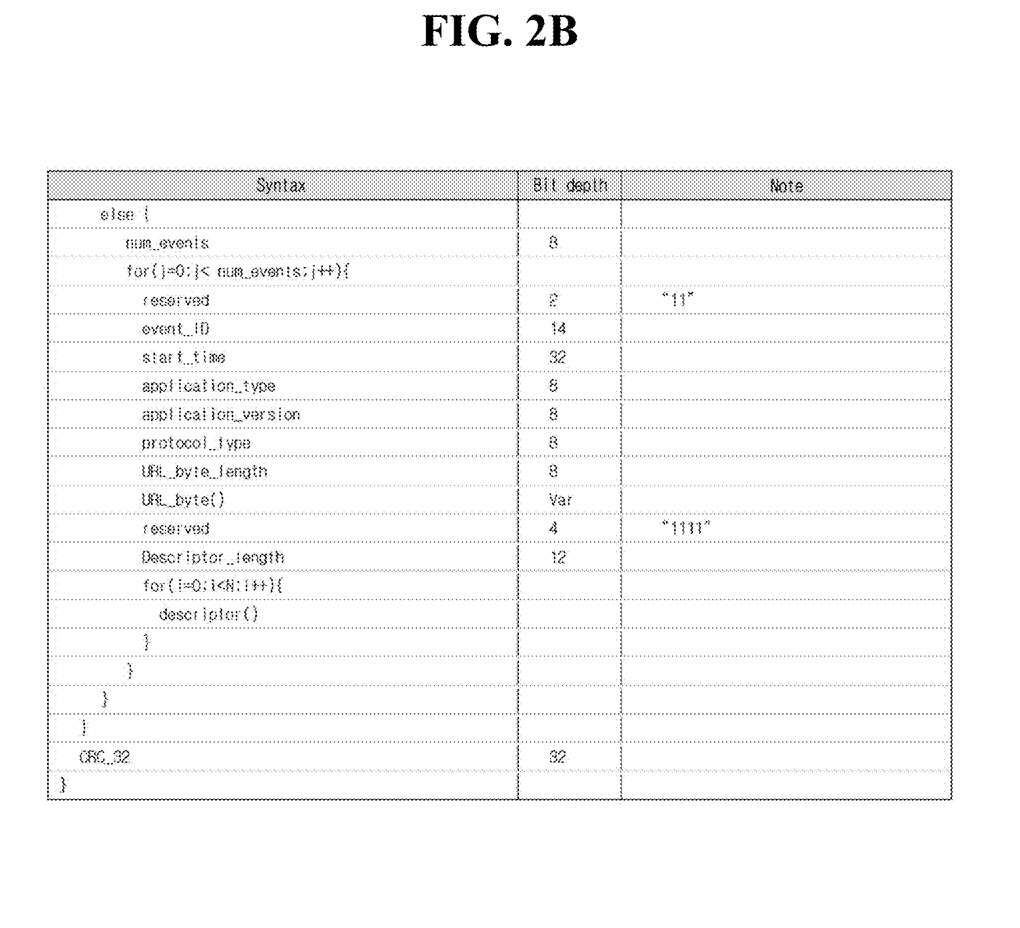

FIG. 2A and FIG. 2B are views exemplifying an AST generated by an ASI configuration unit 130 of a digital broadcast transmitter according to an embodiment of the present disclosure.

Information generated in FIG. 2A and FIG. 2B may be defined as follows.

- table_ID: 8-bit field, having a '0xAA' value to distinguish an AST. When, during an actual operation, the defined value 0xAA conflicts with a predefined value of another application, it may be set to another value in a range of 0x40~0xFE.
- section_syntax_indicator: 1-bit field, which should have a value of 1. Otherwise, an error is determined to occur.
- private_indicator: 1-bit field, which should have a value of 1. Otherwise, an error is determined to occur.
- section_length: 12-bit field, meaning the number of bytes from a field (transport_stream_id) immediately after section_length to a field (CRC_32) where a section ends.
- transport_stream_id: 16-bit field used as an identifier for identifying a corresponding transport stream. This field may be configured to be a same value as the field transport_stream_id in a program association table (PAT) that is transmitted in a same transport stream.

For this, the ASI configuration unit 130 may check PAT information in AV data, which is configured by the AV data configuration unit 110, and configure transport_stream_id of an AST according to transport_stream_id of a PAT.

Figure 3A:
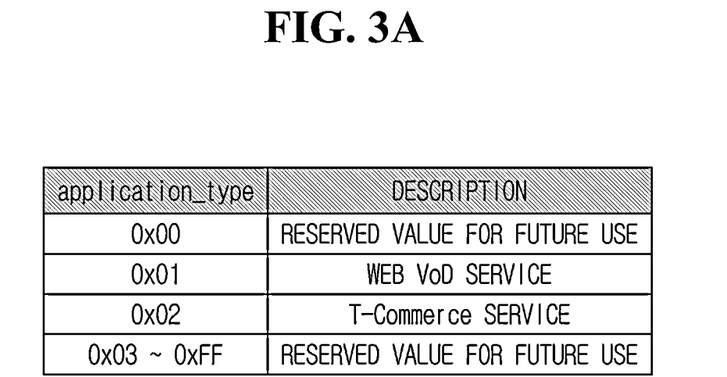
FIG. 3A exemplifies a type of an application configured by a digital broadcast transmitter according to an embodiment of the present disclosure.
Figure 3B:
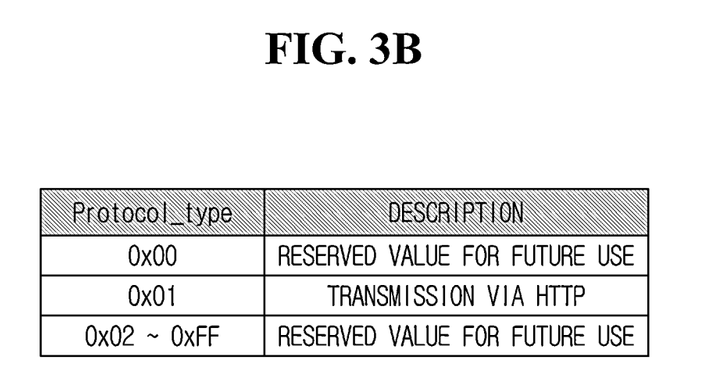
FIG. 3B exemplifies a protocol type configured by a digital broadcast transmitter according to an embodiment of the present disclosure.

- version_number: 5-bit field, denoting a version of a corresponding table (section). Whenever a value of a field in a table changes, version_number increases by 1 (after increasing up to 31, it starts from 0 again).
- current_next_indicator: 1-bit field, indicating whether or not a current table (section) is valid. 1 indicates the validity of a current table (section), and 0 indicates the validity of a table (section) to be transmitted next.
- section_number: 8-bit field, a number used for identifying a section when a table consists of multiple sections.
- last_section_number: 8-bit field, indicating the number of a last section when a table consists of multiple sections.
- protocol_version: 8-bit field used to indicate a protocol version, when an application of a table is different according to each protocol version.
- operator_ID: 8-bit field used to identify a service provider which transmits a corresponding table.
- num_programs_in_section: 8-bit field, indicating the number of programs (virtual channels or service channels) that have application signaling information within a corresponding section.
- program_number: 16-bit field, also used as an identifier for identifying a program (virtual channel or service channel). Mapped with a program_number field in program map tables (PMTs) that are transmitted in a same transport stream, this field is used to identify a program.
- Event_bound_flag: 1-bit field, indicating whether or not application signaling delivered in a corresponding table is connected to an event organized in a program (virtual channel or service channel). 1 means that application signaling is mapped with an event, and 0 means that application signaling is mapped with a program (virtual channel or service channel).
- application_type: 8-bit field used to describe a type for an application. A type for an application uses a value defined in FIG. 3A.
- application_version: 8-bit field, indicating a version of a corresponding application. Whenever information on a corresponding application changes, application_version increases by 1 (after increasing up to 255, it starts from 0 again).
- Protocol_type: 8-bit field, indicating a protocol type transmitting an application. A protocol type uses a value defined in FIG. 3B.
- URL_byte_length: 8-bit field, indicating a byte length of URL information for an application.
- URL_byte( ): field of a variable length, notifying a start position of an application by describing URL of the application. In case protocol_type is HTTP, a URL system defined by HTTP standards should be followed.
- Descriptor_length: 12-bit field, indicating a total length of a descriptor below.
- Descriptor( ): a field of a variable length, which may include a descriptor for an additional user definition. A plurality of descriptors may be used in Descriptor_length.
- num_events: 8-bit field, indicating, when the field event_bound_flag is 1, the number of events providing application signaling in a corresponding program (virtual channel or service channel).
- event_ID: 14-bit field used as an identifier for identifying an event. Mapped with an event_ID field in an event information table (EIT) of PSIP information transmitted in a same transport stream, this field is used to identify an event.

For this, the ASI configuration unit 130 may check EIT information, which is configured by the AV data configuration unit 110, and configure event_ID of an AST according to event_ID of an EIT.

- start_time: 32-bit field, indicating a universal time coordinated (UTC) time where a corresponding event starts.

Figure 4:
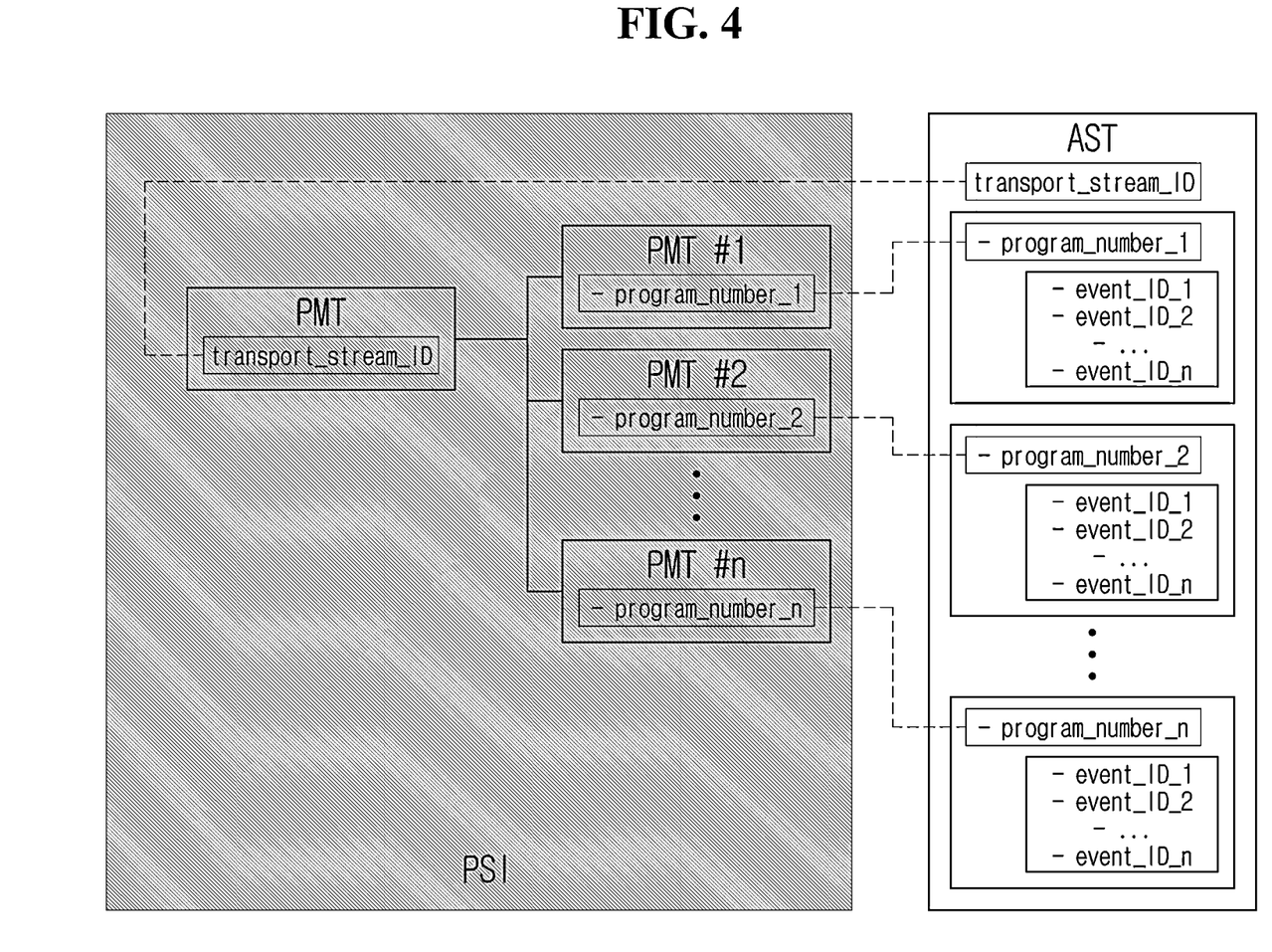
FIG. 4 is a view exemplifying a relationship between information in an AST configured by the ASI configuration unit of FIG. 1 and program specific information (PSI).

FIG. 4 is a view exemplifying a relationship between information in an AST configured by the ASI configuration unit of FIG. 1 and program specific information (PSI).

Referring to FIG. 4, a transport_stream_ID field in an AST may have a same value as a transport_stream_ID value of a PAT, which is transmitted in a same transport stream, and identify a physical channel. In consideration of this, the ASI configuration unit 130 may check a transport_stream_ID value of a PAT, which is transmitted in a same transport stream, and set a value of a transport_stream_ID field in an AST.

As another example, program_number fields in an AST may have a same value as a program_number field in PMTs, which are transmitted in a same transport stream, and identify each service channel (virtual channel). In consideration of this, the ASI configuration unit 130 may check a program_number field value of a PAT, which is transmitted in a same transport stream, and set a value of a program_number field in an AST.

Figure 5:
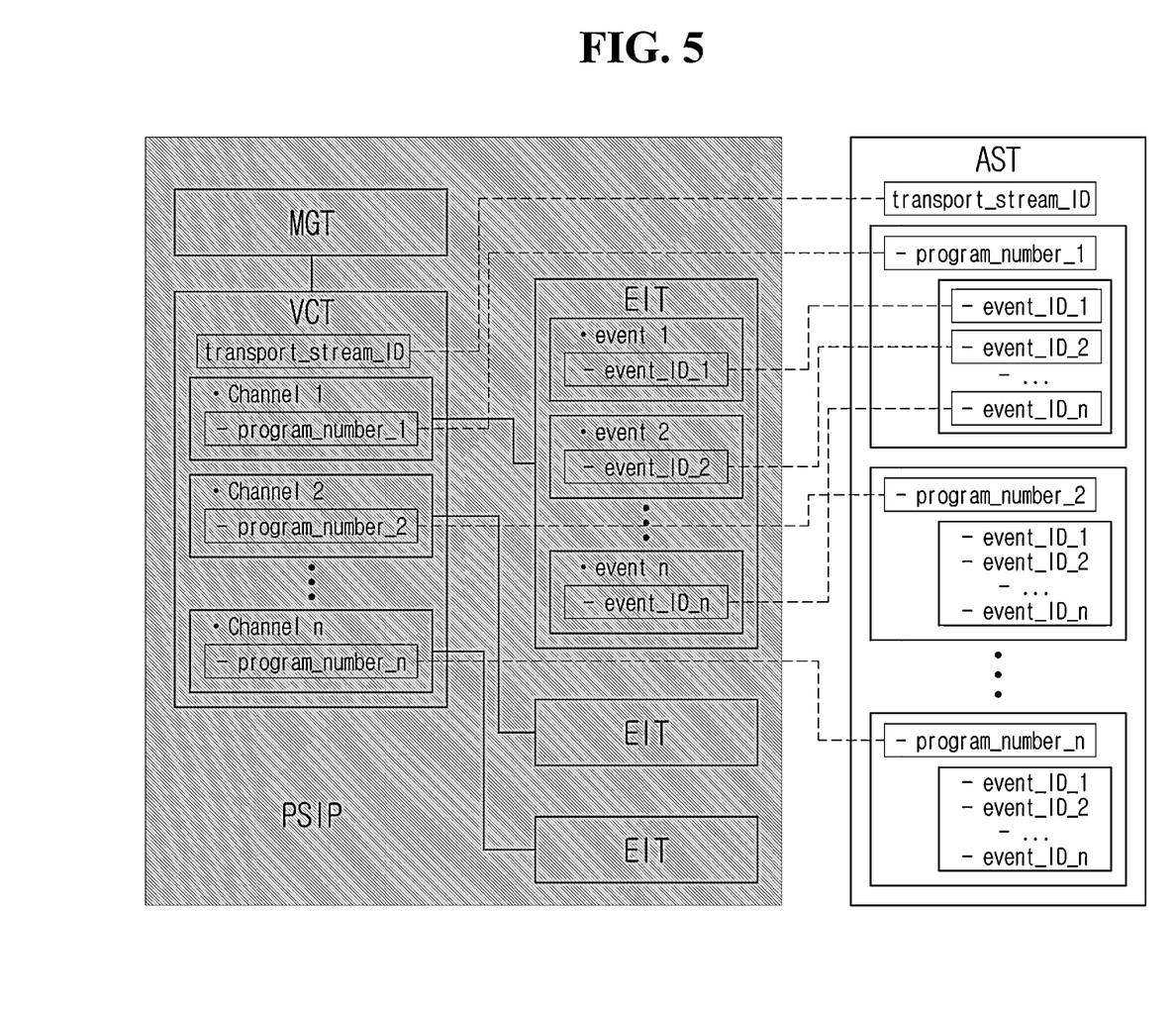
FIG. 5 is a view exemplifying a relationship between information in an AST configured by the ASI configuration unit of FIG. 1 and PSIP information.

FIG. 5 is a view exemplifying a relationship between information in an AST configured by the ASI configuration unit of FIG. 1 and PSIP information.

Referring to FIG. 5, when a PSIP table is present in a same transport stream, information in an AST may be configured to identify a channel or an event by being mapped with PSIP information. In consideration of this, the ASI configuration unit 130 may check a value of a PSIP table among broadcast data transmitted in a same transport stream and configure information in an AST by mapping it with the value of the PSIP table.

For example, the ASI configuration unit 130 may set a value of a transport_stream_ID field in an AST to be equal to a transport_stream_ID value of a virtual channel table (VCT) transmitted in a same transport stream. In consideration of this, a broadcast receiver may check a value of a transport_stream_ID field in an AST and identify a physical channel, to which an application is applied, in broadcast data.

In addition, the ASI configuration unit 130 may set a value of program_number field in an AST to be equal to that of program_number field included in a virtual channel loop of a VCT that is transmitted in a same transport stream. In consideration of this, a broadcast receiver may check a value of a program_number field in an AST and identify each service channel (virtual channel) for broadcast data.

In addition, the ASI configuration unit 130 may set a value of even_ID field in an AST by considering an EIT that delivers event information for a corresponding virtual channel. As an example, the ASI configuration unit 130 may configure the value of even_ID field in an AST to be equal to that of even_ID field of each event loop in an EIT. In consideration of this, a broadcast receiver may check a value of an even_ID field in an AST and thus identify each event for broadcast data.

Figure 6:
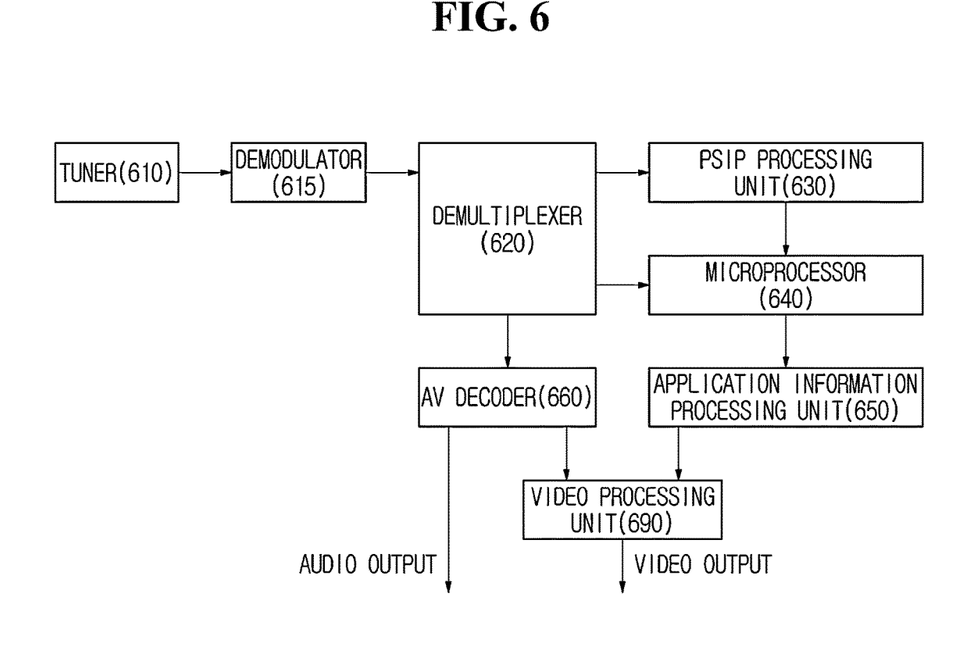
FIG. 6 is a view exemplifying a configuration of a digital broadcast receiver according to an embodiment of the present disclosure.

FIG. 6 is a view exemplifying a configuration of a digital broadcast receiver according to an embodiment of the present disclosure.

Referring to FIG. 6, a digital broadcast receiver according to an embodiment of the present disclosure may include a tuner 610, a demodulator 615, a demultiplexer (demuxer) 620, a PSIP processing unit 630, a microprocessor 640, an application information processing unit 650, and a video processing unit 690.

The digital broadcast receiver thus configured receives and processes PSIP tables and a transport stream including audio/video packets.

The tuner 610 tunes and receives a digital broadcast signal that is transported. Herein, the digital broadcast signal includes a program and system information protocol (PSIP) information that includes an EIT and an ETT.

The demodulator 615 receives the tuned signal and demodulates the signal into a vestigal side band/enhanced vestigal side band (VSB/EVSB) signal.

The demultiplexer 620 demultiplexes and separates audio, video, PSIP information and application signaling information (ASI) from the demodulated and received transport stream packets. Herein, the demultiplexing of the PSIP information may be controlled by the PSIP processing unit 630.

The PSIP processing unit 630 may parse headers of EIT and ETT tables respectively among PSIP tables that are delivered from the demultiplexer 620.

In addition, the PSIP processing unit 630 checks a header of each table delivered from the demultiplexer 620 and adequately processes each table using a PID of a header, table_id, version_number, and section_number.

The microprocessor 640 responds to a viewer's EPG display command and a channel request by controlling the tuner 610 and the PSIP processing unit 630 according to a command that is input through a remote control receiver or a graphic user interface (GUI).

Particularly, the microprocessor 640 may check whether or not an application execution command is input, through a remote control receiver or a GUI. In addition, when confirming that an application execution command is input, the microprocessor 640 may provide the application execution command to the application information processing unit 650.

Based on specific configuration information of an AST that is predefined, the application information processing unit 650 may check a field value listed in the AST and operate the application according to the checked field value.

As an example, the application information processing unit 650 may check a value of a transport_stream_ID field in an AST, match the value with a transport_stream_ID value of a PAT, which is transmitted in a same transport stream, and thus identify a physical channel in which an application is to be executed.

In addition, the application information processing unit 650 may check a value of a program_number field in an AST, match the value with that of a program_number field in PMTs, which are transmitted in a same transport stream, and thus identify a service channel (virtual channel) in which an application is to be executed.

In addition, the ASI configuration unit 130 may check a value of a PSIP table among broadcast data transmitted in a same transport stream and execute an application by matching the value with information in an AST.

For example, the application information processing unit 650 may check a value of a transport_stream_ID field in an AST, match the value with a transport_stream_ID value of a virtual channel table (VCT), which is transmitted in a same transport stream, and thus identify a physical channel in which an application is to be executed.

In addition, the application information processing unit 650 may check a value of a program_number field in an AST, match the value with that of a program_number field in a virtual channel loop of a VCT, which is transmitted in a same transport stream, and thus identify a service channel (virtual channel) in which an application is to be executed.

In addition, the application information processing unit 650 may check a value of an even_ID field in an AST, match an EIT that delivers event information for a corresponding virtual channel, and thus identify an event to execute an application. As an example, the application information processing unit 650 may identify an event to execute an application by matching a value of an even_ID field in an AST with an even_ID field value of each event loop in an EIT.

Meanwhile, a digital broadcast receiver may further include an audio decoder 670 and a video decoder 680, which decode audio/video data separated from the demultiplexer 620 respectively, and a video processing unit 690 that outputs decoded video data from the video decoder 680 or application data output from the application information processing unit 650 selectively and respectively or in overlays to an external display panel.

Figure 7:
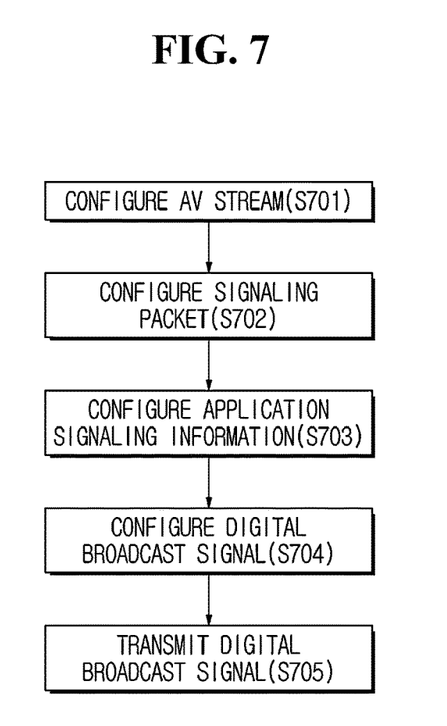
FIG. 7 is a flowchart illustrating a digital broadcast transmitting method according to an embodiment of the present disclosure.

FIG. 7 is a flowchart illustrating a digital broadcast transmitting method according to an embodiment of the present disclosure.

Referring to FIG. 7, a digital broadcast transmitting method according to an embodiment of the present disclosure may be implemented by a digital broadcast transmitter.

First, at step S701, the digital broadcast transmitter may encode audio and video data according to a digital broadcast transmission/reception conformance standard and configure and output an AV stream. In addition, the digital broadcast transmitter may generate an AV packet and a signaling packet by packetizing AV data and signaling information indicating the AV data and output a transmission packet including the AV packet and the signaling packet.

Herein, the digital broadcast transmission/reception conformance standard may be based on the ATSC (Advanced Television System Committee) 3.0 broadcast technology standard. In addition, the signaling information indicates information on AV data that is transmitted by the digital broadcast transmitter. That is, signaling information is generated only for AV data that is generated by each digital broadcast transmitter.

Herein, a packetizing scheme may be employed between the above-described ROUTE protocol scheme and MMT protocol scheme. A ROUTE protocol and an MMT protocol are configured to generate signaling information in different ways.

At step S702, the digital broadcast transmitter may generate and output a signaling packet that includes signaling information for a plurality of AV datasets in each broadcasting service. For example, the signaling information may include a program and system information protocol (PSIP), a virtual channel table (VCT), an EIT and the like.

Particularly, at step S703, the digital broadcast transmitter may configure and provide application signaling information. Herein, ASI has an MPEG-2 private section data structure and may be provided by consisting of a separate TS packet different from an existing broadcasting service. ASI may be configured as an application signaling table (AST), and a detailed construction of an AST may be described in detail with reference to FIG. 2A and FIG. 2B above.

Furthermore, the digital broadcast transmitter may configure and output ASI every predetermined time unit (e.g., every 5 seconds). Accordingly, a broadcast receiver may be embodied to drive an application continuously according to a viewer's viewing point.

In addition, the digital broadcast transmitter may configure ASI for each corresponding channel or each corresponding event and may construct an AST based on information corresponding to PSI in a transport stream. Accordingly, a broadcast receiver may distinguish channels or distinguish information of an application in each channel based on information of an AST corresponding to PSI and operate a proper application.

Specifically, a transport_stream_ID field in an AST may have a same value as a transport_stream_ID value of a PAT, which is transmitted in a same transport stream, and identify a physical channel. In consideration of this, the digital broadcast transmitter may check a transport_stream_ID value of a PAT, which is transmitted in a same transport stream, and set a value of a transport_stream_ID field in an AST.

As another example, program_number fields in an AST may have a same value as a program_number field in PMTs, which are transmitted in a same transport stream, and identify each service channel (virtual channel). In consideration of this, the digital broadcast transmitter may check a program_number field value of a PAT, which is transmitted in a same transport stream, and set a value of a program_number field in an AST.

In addition, when a PSIP table is present in a same transport stream, information in an AST may be configured to identify a channel or an event by being mapped with PSIP information. In consideration of this, the digital broadcast transmitter may check a value of a PSIP table among broadcast data transmitted in a same transport stream and configure information in an AST by mapping it with the value of the PSIP table.

For example, the digital broadcast transmitter may set a value of a transport_stream_ID field in an AST to be equal to a transport_stream_ID value of a virtual channel table (VCT) transmitted in a same transport stream.

In addition, the digital broadcast transmitter may set a value of program_number field in an AST to be equal to that of program_number field included in a virtual channel loop of a VCT that is transmitted in a same transport stream.

In addition, the digital broadcast transmitter may set a value of even_ID field in an AST by considering an EIT that delivers event information for a corresponding virtual channel. As an example, the digital broadcast transmitter may configure the value of even_ID field in an AST to be equal to that of even_ID field of each event loop in an EIT.

Meanwhile, the digital broadcast transmitter configures a broadcast signal by muxing AV data, broadcast data and ASI (S704) and sends the broadcast signal (S705).

Figure 8:
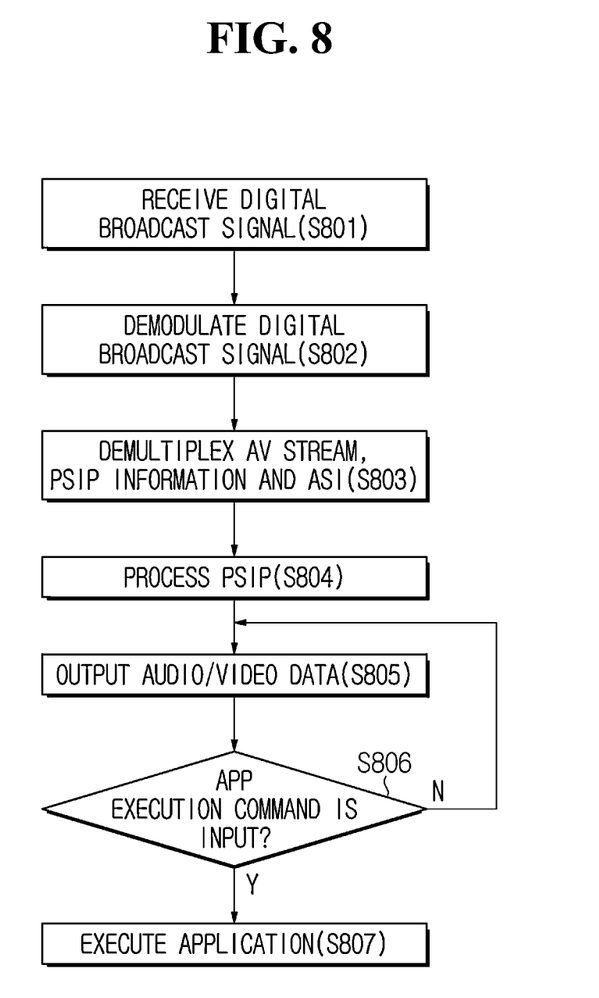
FIG. 8 is a flowchart exemplifying an order of a digital broadcast receiving method according to an embodiment of the present disclosure.

FIG. 8 is a flowchart exemplifying an order of a digital broadcast receiving method according to an embodiment of the present disclosure.

Referring to FIG. 8, the digital broadcast receiving method may be implemented by a digital broadcast receiver.

The digital broadcast receiver thus configured receives and processes PSIP tables and a transport stream including audio/video packets.

First, at step S801, the digital broadcast receiver tunes and receives a digital broadcast signal that is transmitted. Herein, the digital broadcast signal includes a program and system information protocol (PSIP) information that includes an EIT and an ETT.

At step S802, the digital broadcast receiver receives the tuned signal and demodulates the signal into a vestigal side band/enhanced vestigal side band (VSB/EVSB) signal.

At step S803, the digital broadcast receiver demultiplexes and separates audio, video, PSIP information and application signaling information (ASI) from the demodulated and received transport stream packets.

At step S804, the digital broadcast receiver may parse headers of EIT and ETT tables respectively among PSIP tables that are separated at step S803 above. In addition, the digital broadcast receiver checks a header of each table, which is separated at step S803 above, and adequately processes each table using a PID of a header, table_id, version_number, and section_number.

At step S805, the digital broadcast receiver may decode audio/video data respectively, which are separated at step S803 above, and output the decoded audio/video data through an external display panel.

Particularly, at step S806, the digital broadcast receiver may check whether or not an application execution command is input, through a remote control receiver or a GUI. In case the application execution command is input (S806-Y), based on specific configuration information of an AST that is predefined, the digital broadcast receiver may check a field value listed in the AST and operate the application according to the checked field value (S807).

As an example, the digital broadcast receiver may check a value of a transport_stream_ID field in an AST, match the value with a transport_stream_ID value of a PAT, which is transmitted in a same transport stream, and thus identify a physical channel in which an application is to be executed.

In addition, the digital broadcast receiver may check a value of a program_number field in an AST, match the value with that of a program_number field in PMTs, which are transmitted in a same transport stream, and thus identify a service channel (virtual channel) in which an application is to be executed.

In addition, the digital broadcast receiver may check a value of a PSIP table among broadcast data transmitted in a same transport stream and execute an application by matching the value with information in an AST.

For example, the digital broadcast receiver may check a value of a transport_stream_ID field in an AST, match the value with a transport_stream_ID value of a virtual channel table (VCT), which is transmitted in a same transport stream, and thus identify a physical channel in which an application is to be executed.

In addition, the digital broadcast receiver may check a value of a program_number field in an AST, match the value with that of a program_number field in a virtual channel loop of a VCT, which is transmitted in a same transport stream, and thus identify a service channel (virtual channel) in which an application is to be executed.

In addition, the digital broadcast receiver may check a value of an even_ID field in an AST, match an EIT that delivers event information for a corresponding virtual channel, and thus identify an event to execute an application. As an example, the digital broadcast receiver may identify an event to execute an application by matching a value of an even_ID field in an AST with an even_ID field value of each event loop in an EIT.

As described above, the digital broadcast receiver may check a physical channel, a service channel, and an event to execute an application, based on information in an AST, and execute the application according to corresponding information. In addition, during the execution of the application, the digital broadcast receiver may output information, which is required to display, through an external display panel.

Figure 9:
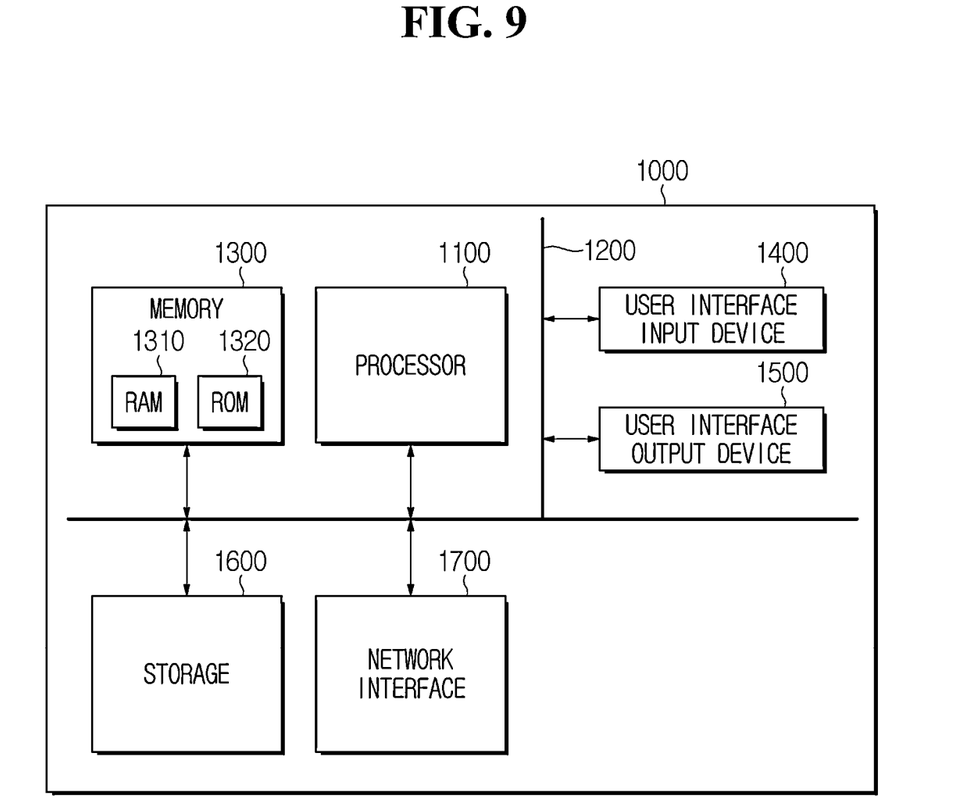
FIG. 9 is a block diagram exemplifying a computing system for implementing a method and apparatus according to an embodiment of the present disclosure.

FIG. 9 is a block diagram exemplifying a computing system for implementing a method and apparatus according to an embodiment of the present disclosure.

Referring to FIG. 9, a computing system 1000 may include at least one processor 1100, a memory 1300, a user interface input device 1400, a user interface output device 1500, a storage 1600, and a network interface 1700, which are connected through a bus 1200.

The processor 1100 may be a semi-conductor device executing the processing of commands stored in a central processing unit (CPU) or the memory 1300 and/or the storage 1600. The memory 1300 and the storage 1600 may include various types of volatile or non-volatile storage media. For example, the memory 1300 may include a read only memory (ROM) and a random access memory (RAM).

Accordingly, steps of a method or an algorithm described in relation to embodiments of the present disclosure may be directly implemented by hardware, which is executed by the processor 1100, a software module, or a combination of these two. A software module may reside in a storage medium (that is, the memory 1300 and/or the storage 1600) like RAM, flash memory, ROM, EPROM, EEPROM, register, hard disk, removable disk, and CD-ROM. An exemplary storage medium is coupled with the processor 1100, and the processor 1100 may read information from a storage medium and may write information into a storage medium. In another method, a storage medium may be integrated with the processor 1100. A processor and a storage medium may reside in an application-specific integrated circuit (ASIC). An ASIC may reside in a user terminal. In another method, a processor and a storage medium may reside in a user terminal as individual components.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method for transmitting a digital broadcast, the method comprising:
    configuring AV data;
    configuring broadcast data;
    configuring application signaling information (ASI) by considering at least one of the AV data and the broadcast data or combination thereof;
    configuring an MPEG-based transport stream by multiplexing the AV data, the broadcast data and the ASI; and
    transmitting the MPEG-based transport stream,
    wherein the ASI includes data for driving an application executed by a broadcast receiver, and
    wherein the configuring of the ASI comprises configuring an application signaling table (AST) for identifying data in the ASI,
    wherein the configuring of the application signaling table (AST) comprises:
        checking a value of a transport_stream_id field in a program association table PAT) included in the broadcast data; and
        setting transport_stream_id of the AST by reflecting the value of the transport stream id field in the PAT.

2. The method of claim 1, wherein the transport_stream_id of the AST is set to be equal to the value of the transport_stream_id field in the PAT.

3. The method of claim 1, wherein the configuring of the application signaling table (AST) further comprises including a number of programs with the ASI.

4. The method of claim 3, wherein the configuring of the application signaling table (AST) further comprises including an identifier of a program with the ASI.

5. The method of claim 4, wherein the configuring of the application signaling table (AST) further comprises:
    checking information in a program_number field of a program map table (PMT) in the broadcast data; and
    configuring program_number of the AST by mapping the information in the program_number field of the PMT.

6. The method of claim 1, wherein the configuring of the application signaling table (AST) further comprises including at least one of a type and a version of the application executed by the broadcast receiver.

7. The method of claim 1, wherein the configuring of the application signaling table (AST) further comprises including a transmission protocol type of the application executed by the broadcast receiver.

8. The method of claim 7, wherein the transmission protocol type of the application includes transmission through HTTP.

9. The method of claim 8, wherein the configuring of the application signaling table (AST) further comprises including URL information for the application.

10. The method of claim 1, wherein the configuring of the application signaling table (AST) further comprises including detailed information of the application executed by the broadcast receiver.

11. The method of claim 10, wherein the configuring of the application signaling table (AST) further comprises checking a total length of the detailed information and including the total length of the detailed information.

12. The method of claim 10, wherein the configuring of the application signaling table (AST) further comprises checking a number of events in a program with the ASI and including the number of events.

13. The method of claim 12, wherein the configuring of the application signaling table (AST) further comprises including an identifier for identifying the events.

14. The method of claim 13, wherein the including of the identifier for identifying the events comprises:

checking event_ID field information of an event information table (EIT) in PSIP information of the broadcast data; and configuring the identifier for identifying the events by reflecting the event_ID field information of the EIT.

15. The method of claim 13, wherein the configuring of the application signaling table (AST) further comprises including time information indicating universal time coordinated (UTC) where the events start.

16. An apparatus for transmitting a digital broadcast, the apparatus comprising:

an AV data configuration unit configured to configure AV data;

a broadcast data generator configured to configure broadcast data;

an application signaling information (ASI) configuration unit configured to configure ASI by considering at least one of the AV data and the broadcast data;

a multiplexer configured to configure an MPEG-based transport stream by multiplexing the AV data, the broadcast data and the ASI; and a data transmitter configured to transmit the MPEG-based transport stream, wherein the ASI includes data for driving an application executed by a broadcast receiver, and wherein the ASI configuration unit configures an application signaling table (AST) for identifying data in the ASI by checking a value of a transport_stream_id field in a program association table (PAT) included in the broadcast data and setting transport_stream_id of the AST by reflecting the value of the transport_stream_id field in the PAT.

\* \* \* \* \*